March 25, 1958  A. J. INGOLIA  2,827,801
AUTOMOTIVE STEERING DEVICE
Filed Jan. 20, 1954  2 Sheets-Sheet 1
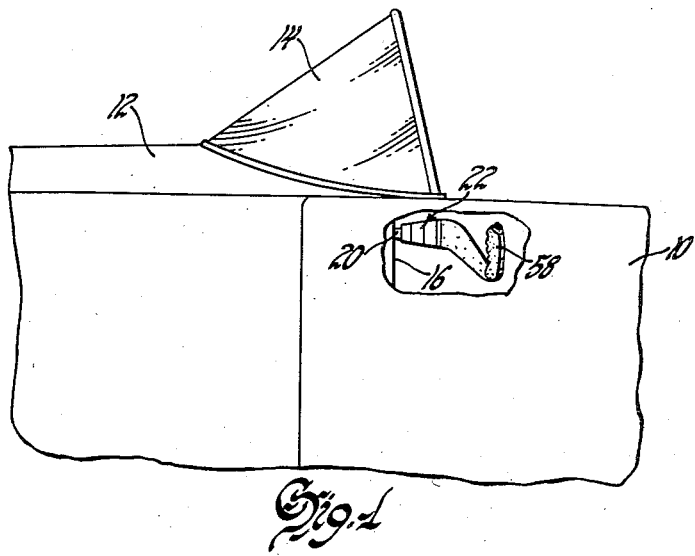
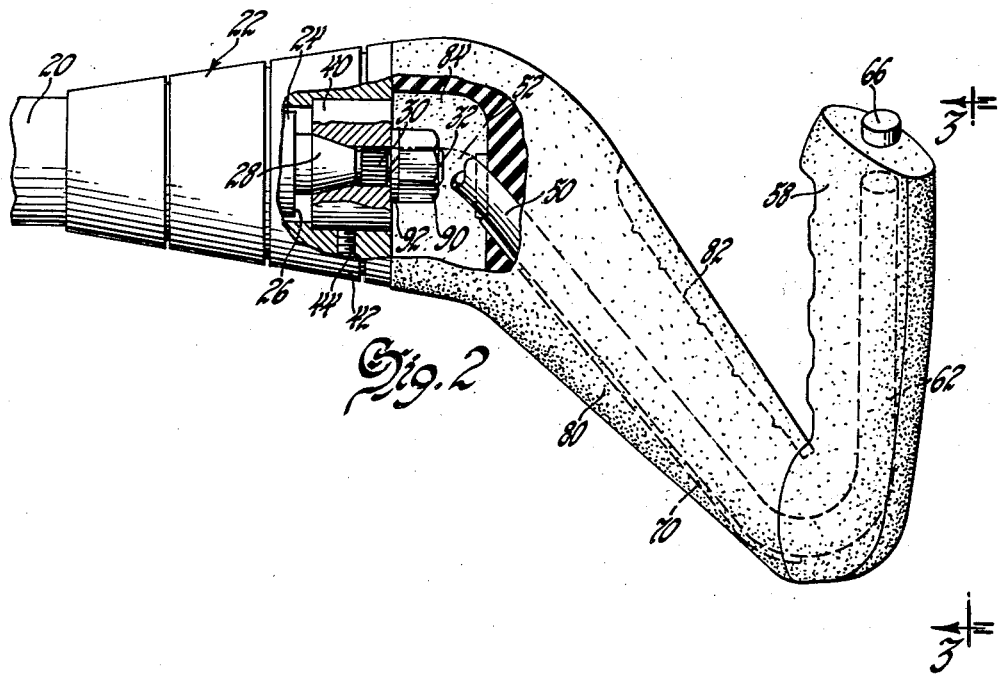
INVENTOR
Anthony J. Ingolia
BY
ATTORNEY March 25, 1958 A. J. INGOLIA 2,827,801
AUTOMOTIVE STEERING DEVICE
Filed Jan. 20, 1954 2 Sheets-Sheet 2
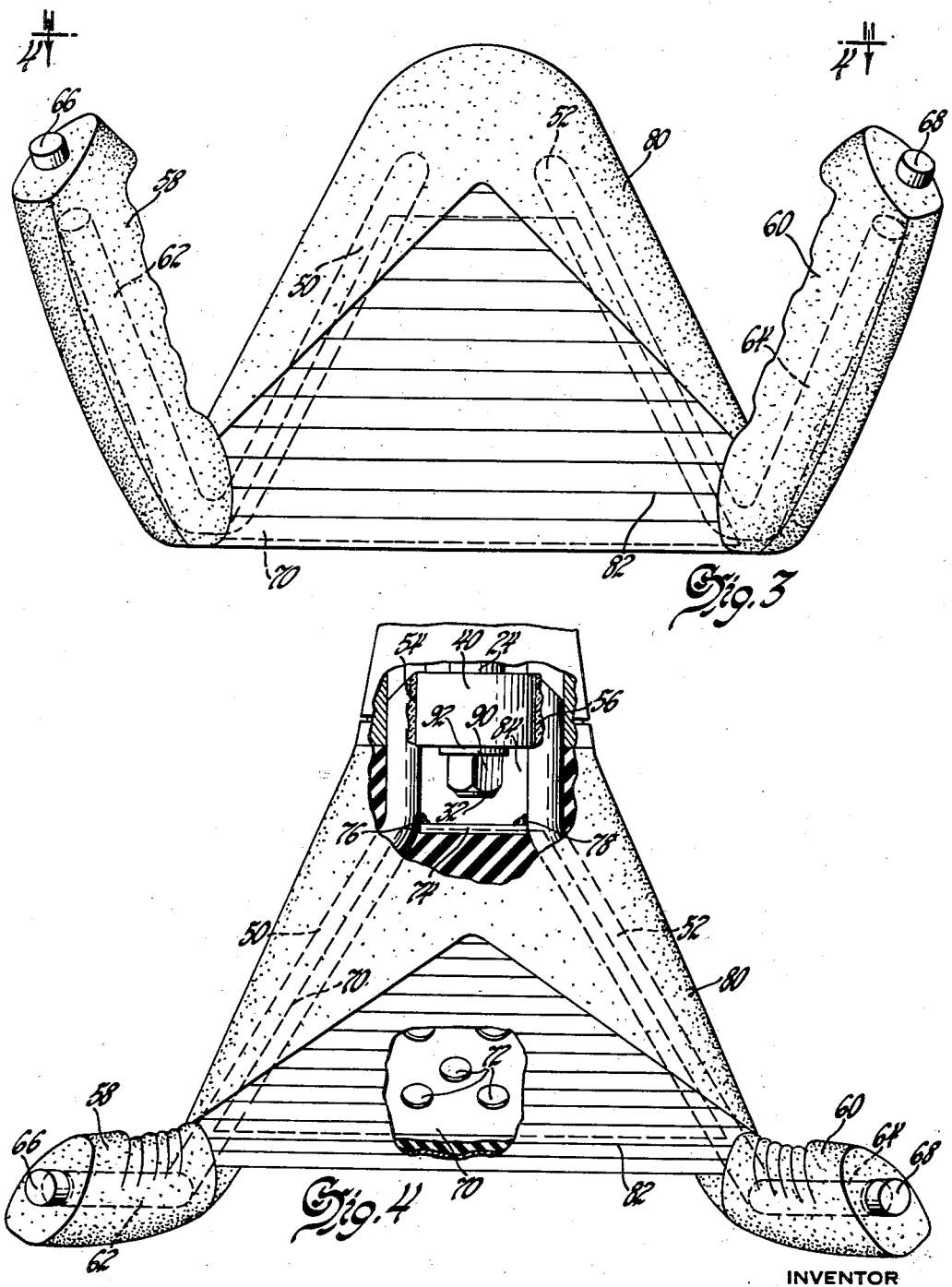
INVENTOR
Anthony J. Ingolia
BY C. H. Dike
ATTORNEY

United States Patent Office 2,827,801
Patented Mar. 25, 1958

2,827,801
AUTOMOTIVE STEERING DEVICE

Anthony J. Ingolia, Detroit, Mich., assignor to General Motors Corporation, Detroit, Mich., a corporation of Delaware Application January 20, 1954, Serial No. 405,083

4 Claims. (Cl. 74—551.1)

This invention relates to steering devices and more particularly to devices to be grasped by the operators and associated with automotive steering columns for guiding vehicles.

Steering wheels for automotive vehicles have heretofore been of such size and configuration as to cause, in many cases, interference with the proper view of the road as well as a waste of passenger space. They also impede movement of passengers in entering or leaving the vehicles. A smaller device could be employed in place of the conventional steering wheel especially with the advent of "power steering" as popularly known in the present stage of automobile developement. A difficulty arises in making such a substitution, however, as an operator should not be forced to rely solely upon the subsequent change of course followed by a vehicle in order to judge the extent of steering effect imposed. A large wheel, when turned, has the advantage of enabling the operator visually to gauge a desired degree of steering movement before or during the change in vehicle travel direction. Another difficulty with automotive steering as heretofore practiced is that conventional steering wheels frequently are the cause of injury to the operators. A sudden stop of a vehicle may cause injury to the head, face or body of a driver forced into violent contact with the steering device.

An object of the present invention is to provide a steering device for an automotive vehicle which is less bulky than a conventional steering wheel and yet of such a nature as to retain the operator guidance characteristic of such wheels.

Another object is to provide an improved steering device affixed to an automotive steering column and which is capable of absorbing shocks of impact, thereby to promote safety of the operator.

A feature of the invention is a steering device affixed to a hub and having diverging sides with hand grips having free ends.

Another feature of the invention is a steering device provided with diverging hand grips and a covering of pad material of sufficient thickness to exhibit substantial shock absorbing characteristics.

These and other important features of the invention will now be described in detail in the specification and then pointed out more particularly in the appended claims.

In the drawings:

Fig. 1 is an elevational view of a portion of an automotive vehicle with a part broken away to show a steering device in which the present invention is embodied;

Fig. 2 is an enlarged side view of the steering device shown in Fig. 1 with portions removed to show the mounting;

Fig. 3 is a view of the steering device as presented to an operator thereof; and Fig. 4 is a plan view with portions removed to illustrate the construction.

In Fig. 1 of the drawings an automotive vehicle is shown having a body 10, an engine compartment hood 12, a windshield 14 and an instrument panel 16. Horizontally projecting rearwardly from the panel 16 is a steering column 20 to which is conventionally joined a standard steering wheel hub 22. This hub is not described in detail as the present invention does not pertain to the hub structure per se and this structure may be modified in many ways without departing from the spirit of the present invention.

A shaft 24 which is rotatable within the column 20 to effect steering of the vehicle by turning of the front wheels is formed with a rearwardly facing annular shoulder 26 within the hub 22. Integral with the shaft 24 is a tapered portion 28, a splined portion 30 and a threaded portion 32.

The steering device comprises a hub 40 which is adapted to fit over the conical portion 28 and to be in splined relation with the portion 30. Conventionally, a part 42 of the column hub 22 may be separately formed to rotate with the shaft 26 and the hub 40. This portion 42 may be non-rotatably fixed with relation to the hub 40 by means of a set screw 44.

The steering device also comprises a frame having two diverging and downwardly inclined frame member portions 50 and 52 the ends of which are welded at 54 and 56 to the sides of the hub 40. If desired, these portions may be of solid material but in the present instance they are tubular in their nature to accommodate and serve as conduits for electrical wires not shown in the drawings.

The frame members also include hand grips 58 and 60 which are of resilient material molded upon portions 62 and 64 which are extensions of the portions 50 and 52, respectively.

As seen in the drawings, the hand grips 58 and 60 are so placed that the lengths thereof extend at an angle with and are spaced from the axis of the hub 40. The particular angle of the grips with relation to the axis of the hub 40 may be varied to suit given requirements and depending upon the most convenient arrangement for the comfort of the operator.

Switch buttons 66 and 68 project from the upper ends of the grips 58 and 60 and may be utilized to open and close switches for a brake control or for some other purpose. Conveniently, either Bowden or electrical wires may be run from the buttons 66 and 68 through the tubular members of the frame and through or into the hub 22 for connection to appropriate mechanisms.

The two frame member portions 50 and 52 are joined into a rigid unit by means of a reinforcement plate or web 70 welded to their undersides. This plate is somewhat triangular in form and is perforated as at 72 to promote lightness of construction.

The frame member portions 50 and 52 are also joined together by means of a vertical plate 74 which is welded in place at 76 and 78.

Molded about the frame member portions 50 and 52 and the web 70 is a pad of resilient rubber-like material 80. For aesthetic as well as for weight reasons, the material 80 is so molded as to form a pleasing design 82 extending from the grip 58 to the grip 60 and somewhat in the shape of a triangle. A side view of the face of this design is presented in Fig. 2 by means of dotted lines. It will be appreciated that many attractive and advantageous designs may be used over a rigid unitary frame such as the one disclosed herein.

In molding the pad material 80 over the frame a recess 84 is formed to extend upwardly and forms an accessible space around the end of the threaded portion 32 on the steering shaft 24. Because of this recess the hub 40 of the steering device may be slipped over the end of the shaft 24 and brought into splined relation with that shaft and a nut 90 may be tightened over the threaded portion 32 to hold the steering assembly together. Conventionally, a washer 92 may be interposed between the nut 90 and the bearing surface of the hub 40.

The term "rigid," as used herein, is intended to indicate a state of being substantially unyielding against forces normally brought to bear. It will be understood, however, that the frame or web of the steering device herein disclosed and considered to be "rigid" may be yielding or flexible when subjected to stresses due to shock or vibration.

I claim:

1. An automotive steering device comprising a rigid frame having a hub and two frame members diverging from said hub, fastening means passing through the said hub and adapted to hold the latter in non-rotative relation with the end of a steering shaft, each of said frame members having a first portion inclined to the axis of said hub and a free end comprising a grip portion arranged at an angle with said first portion, a reinforcement web joining said frame members to form a rigid structural unit therewith, a shock absorbing pad material covering the said first portion of each frame member and said web, and a cavity formed in said pad material giving access to said bolt.

2. An automotive steering device comprising a hub, fastening means passing through said hub and adapted to affix the latter to the end of a steering shaft, two frame members joined to said hub and diverging therefrom, a grip portion supported only by attachment to the end of each of said frame members and having its length extending at an angle with and spaced from the axis of said hub, a web in the form of a flat perforated plate joining said frame members to from a rigid structure, pad material covering said frame members and said web, said pad material having adequate thickness to possess shock absorbing characteristics, and switch buttons arranged on the said grip portions.

3. A steering device comprising a hub fastened coaxially to the end of a horizontally extending automotive steering shaft, a frame with sides diverging and inclined downwardly from and affixed to side portions of said hub, a portion of said frame being a rigid web extending from one of said diverging sides to the other, a yielding material covering said frame and of adequate thickness to provide shock absorbing characteristics, and spaced upwardly extending and diverging hand grips supported solely by their low ends being affixed to the lowest portions of said frame.

4. An automotive steering device comprising a hub and a frame with sides affixed to said hub, each of said sides diverging at an acute angle from the axis of the latter a portion of said frame being in the form of a rigid web extending from one of said sides to the other, spaced diverging hand grips affixed to said frame with the lengths thereof extending in a plane at about 90 degrees with and spaced from the said hub, and one end of each of said hand grips being free.

References Cited in the file of this patent

UNITED STATES PATENTS

| | | | |
|---|---|---|---|
| D. 157,440 | Schindler | Feb. 21, 1950 |
| 504,633 | Squires | Sept. 5, 1893 |
| 1,547,801 | Garrett | July 28, 1925 |
| 1,720,142 | O'Connor | July 9, 1929 |
| 2,179,013 | Kaye | Nov. 7, 1939 |
| 2,180,617 | Snell | Nov. 21, 1939 |
| 2,461,997 | Obszarny et al. | Feb. 15, 1949 |
| 2,491,609 | George | Dec. 20, 1949 |
| 2,563,339 | Kellogg | Aug. 7, 1951 |